Sept. 2, 1941.   H. BANY ET AL   2,254,724
CONTROL SYSTEM
Filed Nov. 1, 1939
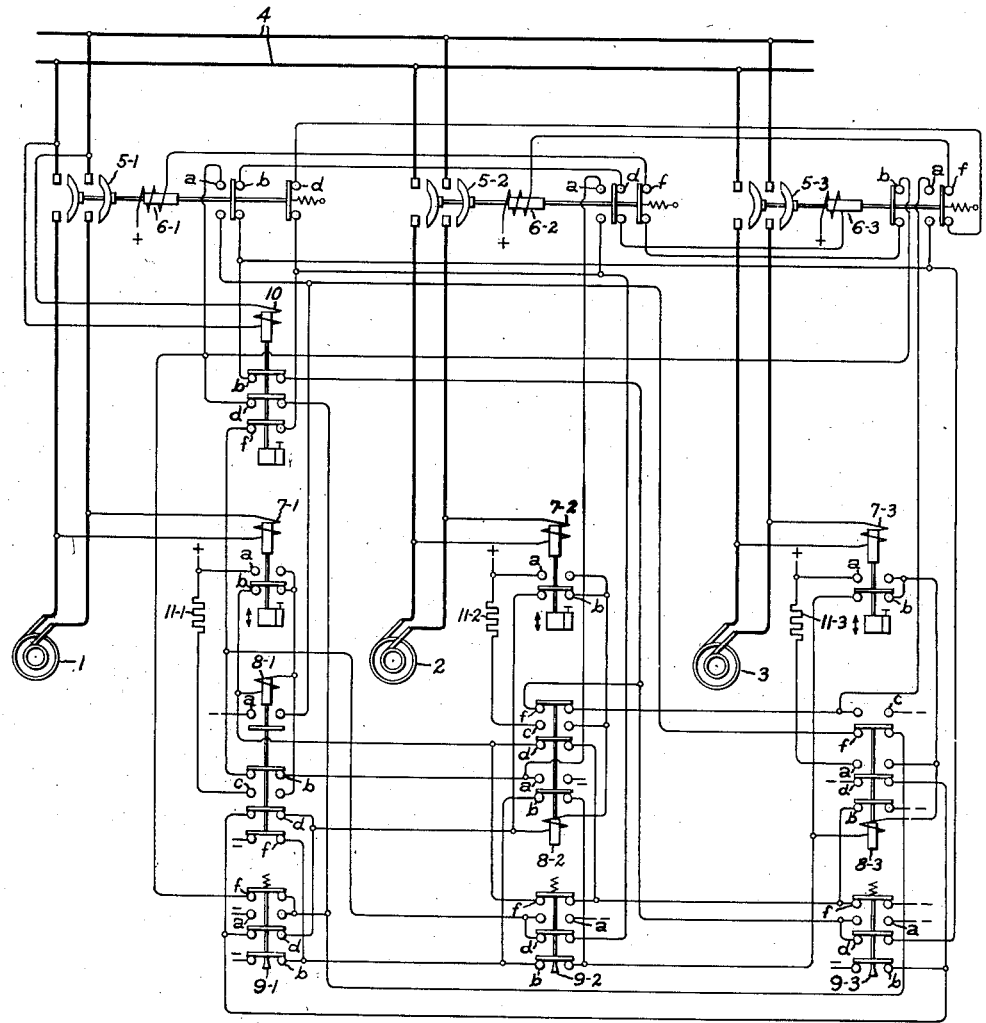
Inventor:
Herman Bany,
Waldo P. Simpson
by Harry E. Dunham
Their Attorney.

Patented Sept. 2, 1941

2,254,724

UNITED STATES PATENT OFFICE 2,254,724

CONTROL SYSTEM

Herman Bany and Waldo P. Simpson, Lansdowne, Pa., assignors to General Electric Company, a corporation of New York Application November 1, 1939, Serial No. 302,386

16 Claims. (Cl. 171—97)

Our invention relates to control systems and particularly to a system for selectively controlling the connections between an electric circuit and a plurality of electric translating devices so that only one of the devices can be connected to the circuit at any given time.

One object of our invention is to provide an improved control arrangement for controlling the connections between a plurality of electric translating devices and an electric circuit so that the failure of a device, when it is connected to the circuit, causes the circuit to be automatically transferred to the next operative device in the predetermined sequence in which the devices are normally arranged to be connected to the circuit.

Another object of our invention is to provide an improved control arrangement for controlling the connections between a plurality of electric translating devices and an electric circuit so that the circuit can be selectively connected to any one of the devices, which is in an operative condition, without changing the sequence in which the circuit is automatically transferred in response to the failure of the device connected thereto.

Our invention will be better understood from the following description when taken in connection with the accompanying drawing the single figure of which diagrammatically illustrates an arrangement for selectively controlling the connections between a plurality of sources of current and a load circuit, and its scope will be pointed out in the appended claims.

Referring to the drawing, 1, 2 and 3 represent sources of current shown as alternating current generators which are arranged to be connected to an alternating current load circuit 4 by suitable switches 5—1, 5—2, 5—3, respectively. As shown, switches 5—1, 5—2, 5—3 are contactors having closing coils 6—1, 6—2, 6—3, respectively.

Generator 1 has associated therewith a voltage relay 7—1 which in turn controls the energizing circuit of an associated control relay 8—1 so that the control relay can be energized when the voltage of generator 1 is above a predetermined value and the control relay is deenergized when the voltage of generator 1 is below a predetermined value. Generators 2 and 3 have associated therewith similar voltage relays 7—2 and 7—3, respectively, which in turn respectively control the energizing circuits of associated control relays 8—2 and 8—3.

Generators 1, 2 and 3 also have associated therewith manually operable two-position control switches 9—1, 9—2 and 9—3, respectively, which determine by their positions which of these sources is the preferred source. These control switches 9—1, 9—2, 9—3 are preferably arranged in any suitable manner, examples of which are well known in the art, so that only one of the switches can be in its operated or closed position at any given instant. However, in order to simplify the disclosure, I have permitted such well known interlocking means. When any one of the manually operable switches 9—1, 9—2, 9—3 is in its closed position, which is the position in which it is not shown, the associated generator is the preferred source of current for load circuit 4, and if the voltage of the associated generator is normal, the generator is connected to the load circuit.

The operation of the arrangement shown in the drawing is as follows: It will first be assumed that all of the manually operable switches 9—1, 9—2, 9—3 are open, which is the position in which they are shown, and that generator 1 is started so that its voltage builds up to a value sufficient to cause the associated voltage relay 7—1 to close its contacts a and thereby complete an energizing circuit for the associated control relay 8—1 through contacts d of relay 8—2 and contacts f of control switch 9—2 in parallel and contacts b of relay 8—3 and contacts f of control switch 9—3 in parallel. The closing of the contacts c of relay 8—1 completes through a resistor 11—1 a shunt circuit around contacts a of relay 7—1 in the energizing circuit of relay 8—1. The closing of contacts a of relay 8—1 completes an energizing circuit for closing coil 6—1 of switch 5—1 through contacts f of switch 5—2, contacts b of switch 5—3, contacts d of relay 10 and contacts f of control switch 9—1 in parallel and contacts f of relay 8—3. The closing of switch 5—1 connects generator 1 to load circuit 4 and the closing of auxiliary contacts a of circuit breaker 5—1 completes a shunt circuit around contacts f of relay 8—3 and parallel connected contacts d of relay 10 and f of control switch 9—1 in the circuit of closing coil 6—1. The opening of auxiliary contacts b and d of switch 5—1, which are respectively connected in the energizing circuits of closing coils 6—3 and 6—2, prevent either switch 5—3 or 5—2 from being closed while switch 5—1 is closed.

It will now be assumed that, while switch 5—1 is closed, generators 2 and 3 are successively started so that their respective voltage relays 7—2 and 7—3 are energized to close their respective contacts a. The closing of contacts a of relay 7—2 completes an energizing circuit for the associated control relay 8—2 through contacts d of control switch 9—1, which are in parallel to contacts d of energized relay 8—1, and contacts b of control switch 9—3 and contacts d of relay 8—3 in parallel. The closing of contacts c of relay 8—2 completes, through resistor 11—2, a shunt circuit around contacts a of relay 7—2 in the energizing circuit of relay 8—2. The closing of contacts a of relay 8—2, however, does not effect the closing of switch 5—2 at this time because the circuit of closing coil 6—2 is open at contacts d of the closed switch 5—1 and contacts b of energized relay 8—1.

When voltage relay 7—3 closes its contacts a, an energizing circuit is completed for relay 8—3 through contacts b of control switch 9—2 which are in parallel to contacts b of energized relay 8—2 and contacts b of control switch 9—1 which are in parallel to contacts f of energized relay 8—1. The closing of contacts a of relay 8—3 completes through resistor 11—3 a shunt circuit around contacts a of relay 7—3 in the energizing circuit of relay 8—3. The closing of contacts c of relay 8—3, however, does not effect the closing of switch 5—3 at this time because the circuit of its closing coil 6—3 is open at contacts b of the closed switch 5—1 and contacts f of energized relay 8—2.

It will now be assumed that, while the switch 5—1 is closed and after the generators 2 and 3 have been started, the generator 1 is shut down so that relay 7—1 is deenergized. After a time delay, relay 7—1 closes its contacts b around the winding of relay 8—1 so that the relay 8—1 becomes deenergized. The opening of contacts a of relay 8—1 interrupts the energizing circuit of closing coil 6—1 of switch 5—1 so that generator 1 is disconnected from load circuit 4. As soon as switch 5—1 closes its auxiliary contacts d, an energizing circuit is completed for closing coil 6—2 of switch 5—2 through contacts f of switch 5—3, contacts d of control switch 9—2, contacts b of control relay 8—1 and contacts a of control relay 8—2. The closing of switch 5—2 connects the generator 2 to the load circuit 4. The closing of auxiliary contacts a of switch 5—2 completes a shunt circuit around contacts d of control switch 9—2 and contacts b of control relay 8—1 in the energizing circuit of closing coil 6—2. By opening its auxiliary contacts f and d the switch 5—2 respectively prevents switches 5—1 and 5—3 from being closed as long as switch 5—2 remains closed.

The closing of auxiliary contacts b of switch 5—1, when it opens under these conditions, does not complete an energizing circuit for closing coil 6—3 of switch 5—3 because this energizing circuit is open at contacts f of control relay 8—2.

It will now be assumed that, while switch 5—2 is closed and both of the other generators 1 and 3 are in operative condition, generator 2 fails or is shut down so that voltage relay 7—2 becomes deenergized and closes its contacts b in a shunt circuit around the winding of relay 8—2. The opening of contacts a of relay 8—2 interrupts the energizing circuit of closing coil 6—2 so that switch 5—2 opens and disconnects generator 2 from load circuit 4. The closing of auxiliary contacts d of switch 5—2 completes an energizing circuit for closing coil 6—3 of switch 5—3 through contacts d of switch 5—2, contacts b of switch 5—1, contacts d of control switch 9—3, contacts f of relay 8—2 and contacts c of relay 8—3 so that switch 5—3 is closed to connect generator 3 to load circuit 4. The closing of auxiliary contacts a of switch 5—3 completes a shunt circuit around contacts d of control switch 9—3 and contacts f of control relay 8—2 in the circuit of closing coil 6—3. Although relay 8—1 is energized when switch 5—2 closes its auxiliary contacts f, the circuit for closing coil 6—1 is not completed at this time because it is open at contacts f of control relay 8—3.

It will now be assumed that, while switch 5—3 is closed and both of the other generators 1 and 2 are in operative condition, generator 3 fails or is shut down so that voltage relay 7—3 becomes deenergized and closes its contacts b in a shunt circuit around the winding of relay 8—3. The opening of contacts c of relay 8—3 interrupts the energizing circuit of closing coil 6—3 so that switch 5—3 opens to disconnect generator 3 from load circuit 4. The closing of auxiliary contacts b of switch 5—3 completes an energizing circuit for closing coil 6—1 of switch 5—1 through contacts f of switch 5—2, contacts b of switch 5—3, contacts f of control switch 9—1, contacts f of control relay 8—3 and contacts a of control relay 8—1. The closing of switch 5—1 connects generator 1 to the load circuit 4. The closing of auxiliary contacts a of switch 5—1 completes a shunt circuit around contacts f of relay 8—3 and contacts f of control switch 9—1 in the energizing circuit of closing coil 6—1. Although relay 8—2 is energized, when switch 5—3 closes its auxiliary contacts f, an energizing circuit is not completed for closing coil 6—2 at this time because this circuit is open at contacts b of relay 8—1.

From the above description, it will be seen that normally sources 1, 2 and 3 are arranged to be connected to the load circuit 4 in a predetermined sequence and when the source, which at any instant happens to be connected to the load circuit, fails or is shut down, the load circuit is automatically transferred to the next operative source in the predetermined sequence.

In case it is desired to transfer load circuit 4 from whichever operative source it is connected to another operative source, this can be done by moving to its closed position the manually operable switch associated with the operative source to which it is desired to transfer the load circuit. For example, if switch 5—1 is closed and it is desired to transfer load circuit 4 to generator 2, this can be done by merely moving switch 9—2 to its closed position. Since contacts b, d and f of control relay 8—2 are open when the control switch 9—2 is moved to its closed position, the opening of contacts f of switch 9—2 interrupts the energizing circuit of control relay 8—1 and the opening of contacts b of switch 9—2 interrupts the energizing circuit of control relay 8—3. The opening of contacts a of control relay 8—1 interrupts the energizing circuit of closing coil 6—1 so that generator 1 is disconnected from load circuit 4. As soon as time relay 10 closes its contacts f, after load circuit 4 is deenergized, an energizing circuit is completed for closing coil 6—2 of switch 5—2 through contacts f of switch 5—3, contacts d of switch 5—1, contacts f of relay 10 and contacts a of control switch 9—2 so that generator 2 is connected to load circuit 4.

In case the source 2 fails, while control switch 9—2 is in its closed position, the deenergization of the associated voltage relay 7—2 effects the transfer of load circuit 4 to the next operative source in the normal sequence in which the sources are connected to the load circuit. For example, assume generator 3 is operative, when source 2 fails control relay 8—2 is deenergized as heretofore described. Contact *f* of 8—2 prepares the energizing circuit of closing coil 6—3. Contact *b* of 8—2 completes the coil circuit of control relay 8—3. Relay 8—3 is energized and closes its contact *c* which completes the energizing circuits for closing coil 6—3. Switch 5—3 closes connecting generator 3 to load circuit 4.

If, while control switch 9—2 is closed and generator 3 is connected to the load circuit 4, generator 2 again becomes operative so that its associated voltage relay 7—2 and control relay 8—2 are energized, load circuit 4 is immediately transferred back to the preferred source 2 because, as soon as control relay 8—2 becomes energized, the opening of its contacts *b* interrupts the energizing circuit of control relay 8—3 and an energizing circuit for the closing coil 6—2 of switch 5—2 is completed through contacts *a* of switch 9—2 as soon as time relay 10 closes its contacts *f* after generator 3 is disconnected from load circuit 4.

Similarly, if it is desired to transfer load circuit 4 to generator 3, this can be done by merely closing control switch 9—3 so that its contacts *f* and *b* are opened to effect the deenergization of control relays 8—1 and 8—2, respectively. As soon as relay 10 closes its contacts *b*, after load circuit 4 becomes deenergized, an energizing circuit is completed for closing coil 6—3 of switch 5—3 through contacts *a* of switch 9—3 to connect the generator 3 to load circuit 4.

The load circuit 4 may be transferred to generator 1 by closing the associated control switch 9—1 which effects in a similar manner the opening of switch 5—2 or 5—3, depending upon which is closed, and the subsequent closing of switch 5—1 to connect the generator 1 to load circuit 4.

While we have, in accordance with the patent statutes, shown and described our invention as applied to a particular system and as embodying various devices diagrammatically indicated, changes and modifications will be obvious to those skilled in the art, and we therefore aim in the appended claims to cover all such changes and modifications as fall within the true spirit and scope of our invention.

What we claim as new and desire to secure by Letters Patent of the United States, is:

1. In combination, an electric circuit, a plurality of electric translating devices to be connected thereto, an individual control relay associated with each electric translating device, a control switch associated with each electric translating device, means for energizing a control relay only when each of the other control relays is deenergized or the control switch associated with an energized relay is in a predetermined position, and means responsive to the energization of a control relay for connecting the associated electric translating device to said circuit when all of the other devices are disconnected from said circuit and the control relay associated with another predetermined electric translating device is deenergized.

2. In combination, an electric circuit, a plurality of electric translating devices to be connected thereto, an individual control relay associated with each electric translating device, a control switch associated with each electric translating device, means for energizing a control relay only when each of the other control relays is deenergized or the control switch associated with an energized relay is in a predetermined position, and means responsive to the energization of a control relay for connecting the associated electric translating device to said circuit when all of the other devices are disconnected from said circuit and the control relay associated with another predetermined electric translating device is deenergized and the control switch associated with the energized control relay is in said predetermined position.

3. In combination, an electric circuit, a plurality of electric translating devices to be connected thereto, an individual control relay associated with each electric translating device, a control switch associated with each electric translating device, means for energizing a control relay only when each of the other control relays is deenergized or the control switch associated with an energized relay is in a predetermined position, means responsive to the energization of a control relay for connecting the associated electric translating device to said circuit when all of the other devices are disconnected from said circuit and the control relay associated with another predetermined electric translating device is deenergized and the control switch associated with the energized control relay is in said predetermined position, and means responsive to the movement of a control switch out of said predetermined position while the other control switches are in said predetermined positions respectively for effecting the disconnection of any other device than its associated device from said circuit and the subsequent connection of its associated device to said circuit.

4. In combination, an electric circuit, a plurality of electric translating devices to be connected thereto, an individual control relay associated with each electric translating device, a control switch associated with each electric translating device, means for energizing a control relay only when each of the other control relays is deenergized or the control switch associated with an energized relay is in a predetermined position, means responsive to the energization of a control relay for connecting the associated electric translating device to said circuit when all of the other devices are disconnected from said circuit and the control relay associated with another predetermined electric translating device is deenergized and the control switch associated with the energized control relay is in said predetermined position, and means responsive to the movement of a control switch out of said predetermined position while the other control switches are in said predetermined positions respectively for effecting the disconnection of any other device than its associated device from said circuit and the subsequent connection of its associated device to said circuit when the voltage of said circuit decreases below a predetermined value.

5. In combination, an electric circuit, a plurality of electric translating devices to be connected thereto, an individual control relay associated with each electric translating device, a control switch associated with each electric translating device, means for energizing a control relay only when each of the other control relays is deenergized or the control switch associated with an energized relay is in a predetermined position, and means responsive to the energization of a control relay for connecting the associated electric translating device to said circuit when all of the other devices are disconnected from said circuit and the control switch associated with the energized control relay is not in said predetermined position.

6. In combination, an electric circuit, a plurality of electric translating devices to be connected thereto, an individual control relay associated with each electric translating device, a control switch associated with each electric translating device, means for energizing a control relay only when each of the other control relays is deenergized or the control switch associated with an energized relay is in a predetermined position, and means responsive to the energization of a control relay for connecting the associated electric translating device to said circuit when all of the other devices are disconnected from said circuit and the control switch associated with the energized control relay is not in said predetermined position and the voltage of said circuit remains below a predetermined value for a predetermined time.

7. In combination, an electric circuit, a plurality of sources of current to be connected thereto, an individual control relay associated with each source, a control switch associated with each source, means for energizing a control relay only when the voltage of the associated source is above a predetermined value and either each of the other control relays is deenergized or the control switch associated with an energized control relay is in a predetermined position, and means responsive to the energization of a control relay for connecting the associated source to said circuit when all of the other sources are disconnected from said circuit and the control relay associated with another predetermined source is deenergized.

8. In combination, an electric circuit, a plurality of sources of current to be connected thereto, an individual control relay associated with each source, a control switch associated with each source, means for energizing a control relay only when the voltage of the associated source is above a predetermined value and either each of the other control relays is deenergized or the control switch associated with an energized control relay is in a predetermined position, and means responsive to the energization of a control relay for connecting the associated source to said circuit when all of the other sources are disconnected from said circuit and the control switch associated with the energized control relay is not in said predetermined position.

9. In combination, an electric circuit, a plurality of sources of current to be connected thereto, an individual control relay associated with each source, a control switch associated with each source, means for energizing a control relay only when the voltage of the associated source is above a predetermined value and either each of the other control relays is deenergized or the control switch associated with an energized control relay is in a predetermined position, and means responsive to the energization of a control relay for connecting the associated source to said circuit when all of the other sources are disconnected from said circuit and the control switch associated with the energized control relay is not in said predetermined position and the voltage of said circuit remains below a predetermined value for a predetermined time.

10. In combination, an electric circuit, a plurality of sources of current to be connected thereto, an individual control relay associated with each source, a control switch associated with each source, means for energizing a control relay only when the voltage of the associated source is above a predetermined value and either each of the other control relays is deenergized or the control switch associated with an energized control relay is in a predetermined position, and means responsive to the energization of a control relay for connecting the associated source to said circuit when all of the other sources are disconnected from said circuit and the control relay associated with another predetermined source is deenergized and the control switch associated with the energized control relay is in said predetermined position.

11. In combination, an electric circuit, a plurality of sources of current to be connected thereto, an individual control relay associated with each source, a control switch associated with each source, means for energizing a control relay only when the voltage of the associated source is above a predetermined value and either each of the other control relays is deenergized or the control switch associated with an energized control relay is in a predetermined position, and means responsive to the energization of a control relay for connecting the associated source to said circuit when all of the other sources are disconnected from said circuit and the control relay associated with another predetermined source is deenergized and the control switch associated with the energized control relay is in said predetermined position and the voltage of said circuit remains below a predetermined value for a predetermined time.

12. In combination, an electric circuit, a plurality of sources of current to be connected thereto, an individual control relay associated with each source, means for energizing each control relay only when the voltage of the associated source is above a predetermined value, an individual switch associated with each source for connecting it to said circuit, an operating winding individual to each switch, and means for energizing the operating winding of an open switch in response to all of the other switches being open and the associated control relay being energized and a predetermined one of the other control relays being deenergized whereby said switches are closed in a predetermined sequence in response to a voltage failure of a source connected to said circuit.

13. In combination, an electric circuit, a plurality of sources of current to be connected thereto, an individual control relay associated with each source, means for energizing each control relay only when the voltage of the associated source is above a predetermined value, an individual switch associated with each source for connecting it to said circuit, an operating winding individual to each switch, and means for energizing the operating winding of an open switch in response to all of the other switches being open and the associated control relay being energized and a predetermined one of the other control relays being deenergized and the voltage of said circuit being below a predetermined value whereby said switches are closed in a predetermined sequence in response to a voltage failure of a source connected to said circuit.

14. In combination, an electric circuit, a plurality of sources of current to be connected thereto, an individual control relay associated with each source, means for energizing each control relay only when the voltage of the associated source is above a predetermined value, an individual switch associated with each source for connecting it to said circuit, an operating winding individual to each switch, a voltage relay responsive to the voltage of said electric circuit, and means for energizing the operating winding of an open switch in response to all of the other switches being open and the associated control relay being energized and a predetermined one of the other control relays being deenergized and said voltage relay being in its deenergized position whereby said switches are closed in a predetermined sequence in response to a voltage failure of a source connected to said circuit.

15. In combination, an electric circuit, a plurality of sources of current to be connected thereto, an individual control relay associated with each source, means for energizing each control relay only when the voltage of the associated source is above a predetermined value, an individual switch associated with each source for connecting it to said circuit, an operating winding individual to each switch, means for energizing the operating winding of an open switch in response to all of the other switches being open and the associated control relay being energized and a predetermined one of the other control relays being deenergized whereby said switches are closed in a predetermined sequence in response to a voltage failure of a source connected to said circuit, and means responsive to the closing of a switch for maintaining the associated winding energized independently of the energized condition of the other predetermined control relay that controlled the energization thereof while the switch is open.

16. In combination, an electric circuit, a plurality of sources of current to be connected thereto, an individual control relay associated with each source, means for energizing each control relay only when the voltage of the associated source is above a predetermined value, an individual switch associated with each source for connecting it to said circuit, an operating winding individual to each switch, a voltage relay responsive to the voltage of said electric circuit, means for energizing the operating winding of an open switch in response to all of the other switches being open and the associated control relay being energized and a predetermined one of the other control relays being deenergized and said voltage relay being in its deenergized position whereby said switches are closed in a predetermined sequence in response to a voltage failure of a source connected to said circuit, and means responsive to the closing of a switch for maintaining the associated winding energized independently of the energized condition of the other predetermined control relay that controlled the energization thereof while the switch is open.

HERMAN BANY.
WALDO P. SIMPSON.